(12) United States Patent
Wang

(10) Patent No.: US 7,597,123 B2
(45) Date of Patent: Oct. 6, 2009

(54) AUTOMATIC BUILT-IN AIR NOZZLE

(76) Inventor: Cheng-Chung Wang, 9F, No. 24, Songjhih Rd., Sinyi Dist., Taipei (TW)

( * ) Notice: Subject to any disclaimer, the term of this patent is extended or adjusted under 35 U.S.C. 154(b) by 160 days.

(21) Appl. No.: 11/432,461

(22) Filed: May 11, 2006

(65) Prior Publication Data
US 2007/0000569 A1 Jan. 4, 2007

(30) Foreign Application Priority Data
May 18, 2005 (CN) .................... 2005 1 0034640

(51) Int. Cl.
*B65B 3/16* (2006.01)
(52) U.S. Cl. .................... 141/114; 141/313; 5/706
(58) Field of Classification Search .............. 141/114, 141/192, 197, 313, 363; 417/423.1; 5/706–715
See application file for complete search history.

(56) References Cited
U.S. PATENT DOCUMENTS 2,989,061 A * 6/1961 Winkler ..................... 134/140
3,452,393 A * 7/1969 Holland, Jr. et al. ........... 425/97
4,838,309 A * 6/1989 Goodwin ..................... 137/554
5,191,835 A * 3/1993 Blanchard ................... 101/148
6,145,538 A * 11/2000 Park ........................... 137/554
6,904,631 B2 * 6/2005 Vrzalik et al. ................. 5/615
7,097,148 B2 * 8/2006 DeWall et al. ......... 251/129.12
7,346,945 B2 * 3/2008 Phillips et al. ................. 5/616
2001/0044969 A1* 11/2001 Chaffee ..................... 5/655.3
2006/0017032 A1* 1/2006 DeWall et al. ......... 251/129.11

* cited by examiner

*Primary Examiner*—Timothy L Maust
*Assistant Examiner*—Jason K Niesz
(74) *Attorney, Agent, or Firm*—Alan Kamrath; Kamrath & Associates PA

(57) ABSTRACT

An automatic air nozzle includes a valve adapted to engage with a peripheral side face defining the air path inside the inflatable object. A linking element has a first end operably connected to the valve and a second end. A motor is operably connected to the second end of the linking element so as to drive the valve to move linearly relative to the inflatable object to open/close the air path automatically.

7 Claims, 18 Drawing Sheets

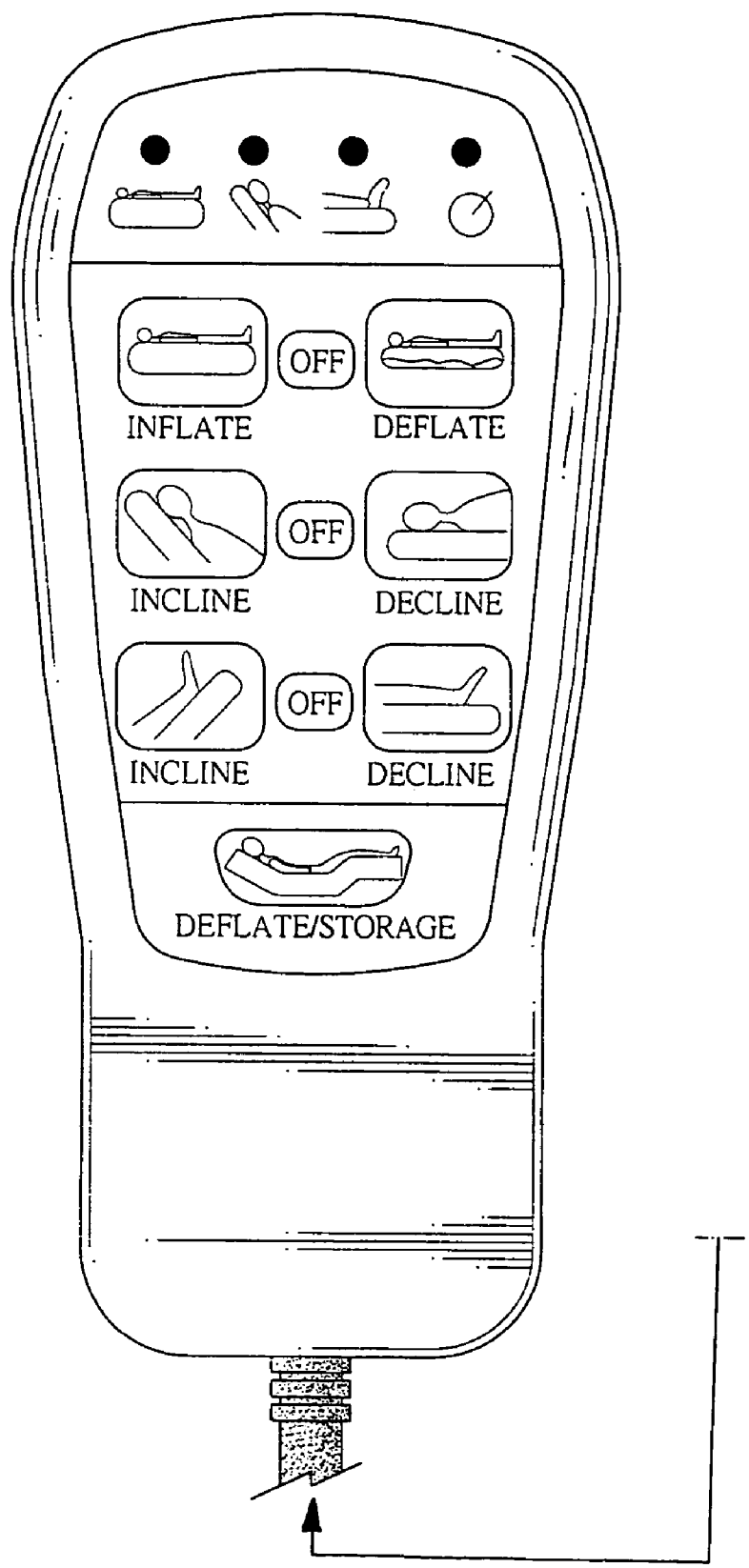
FIG.7A1

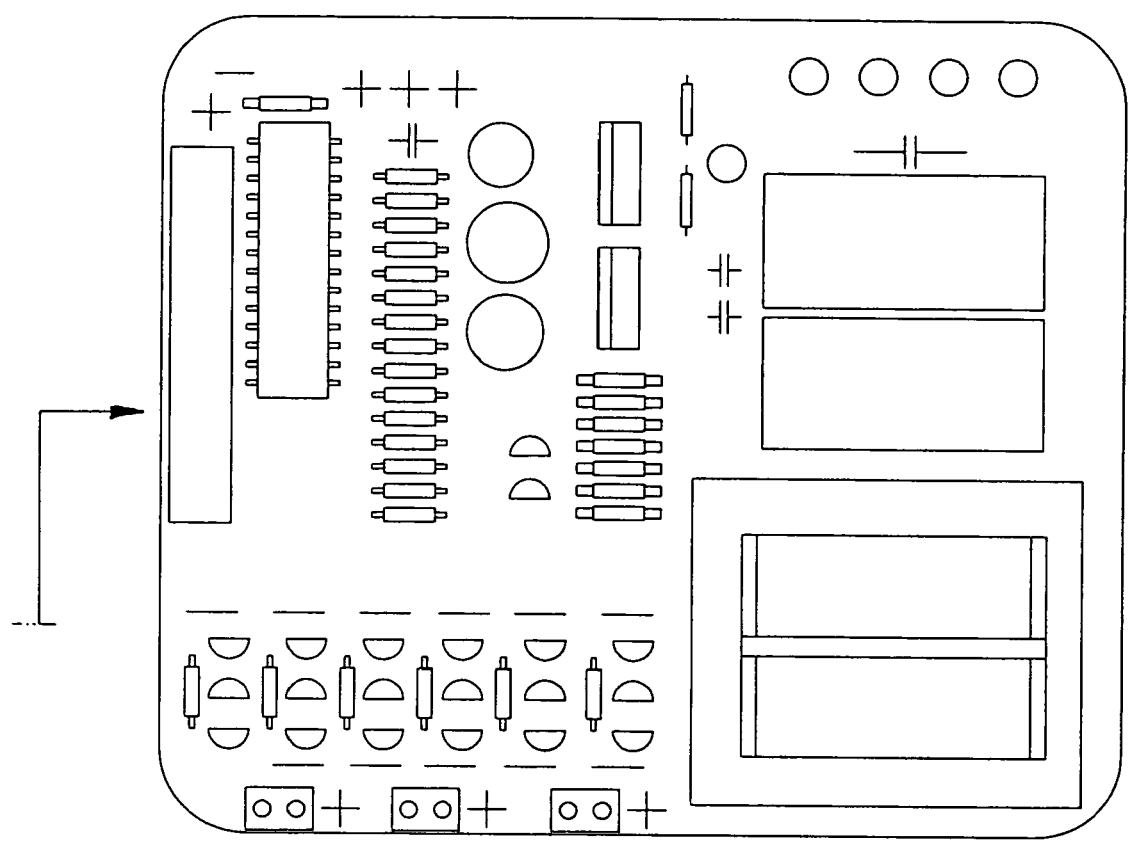
FIG.7A2

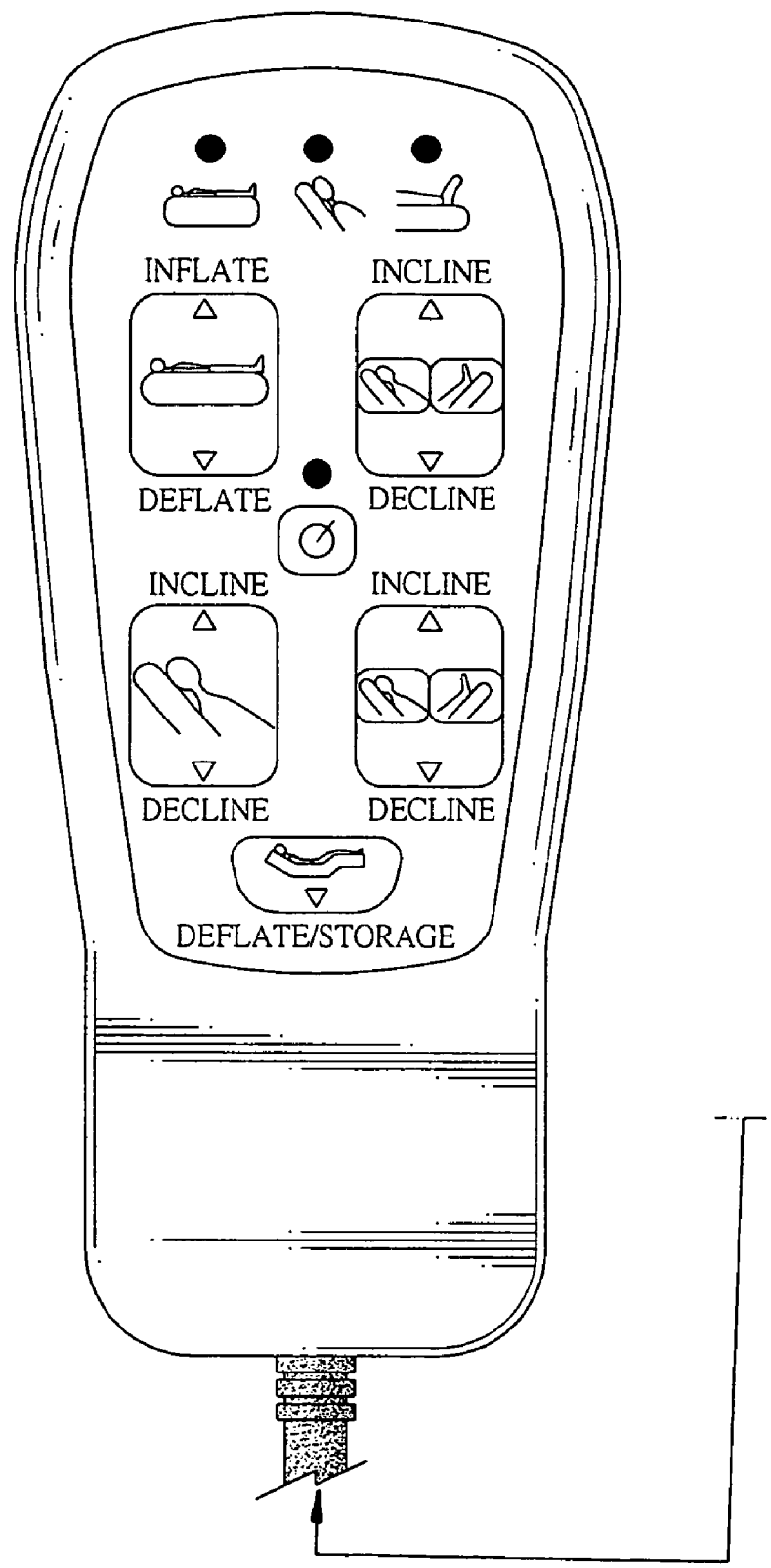
FIG.7B1

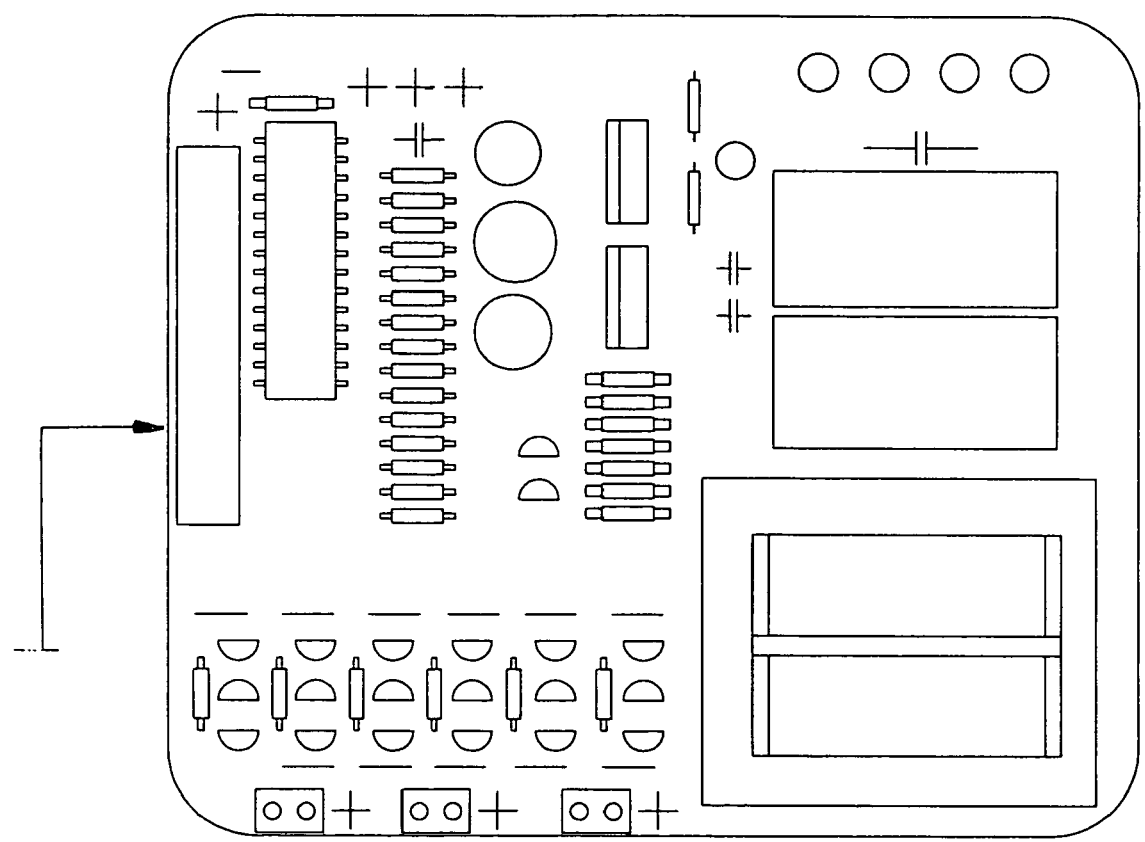
FIG.7B2

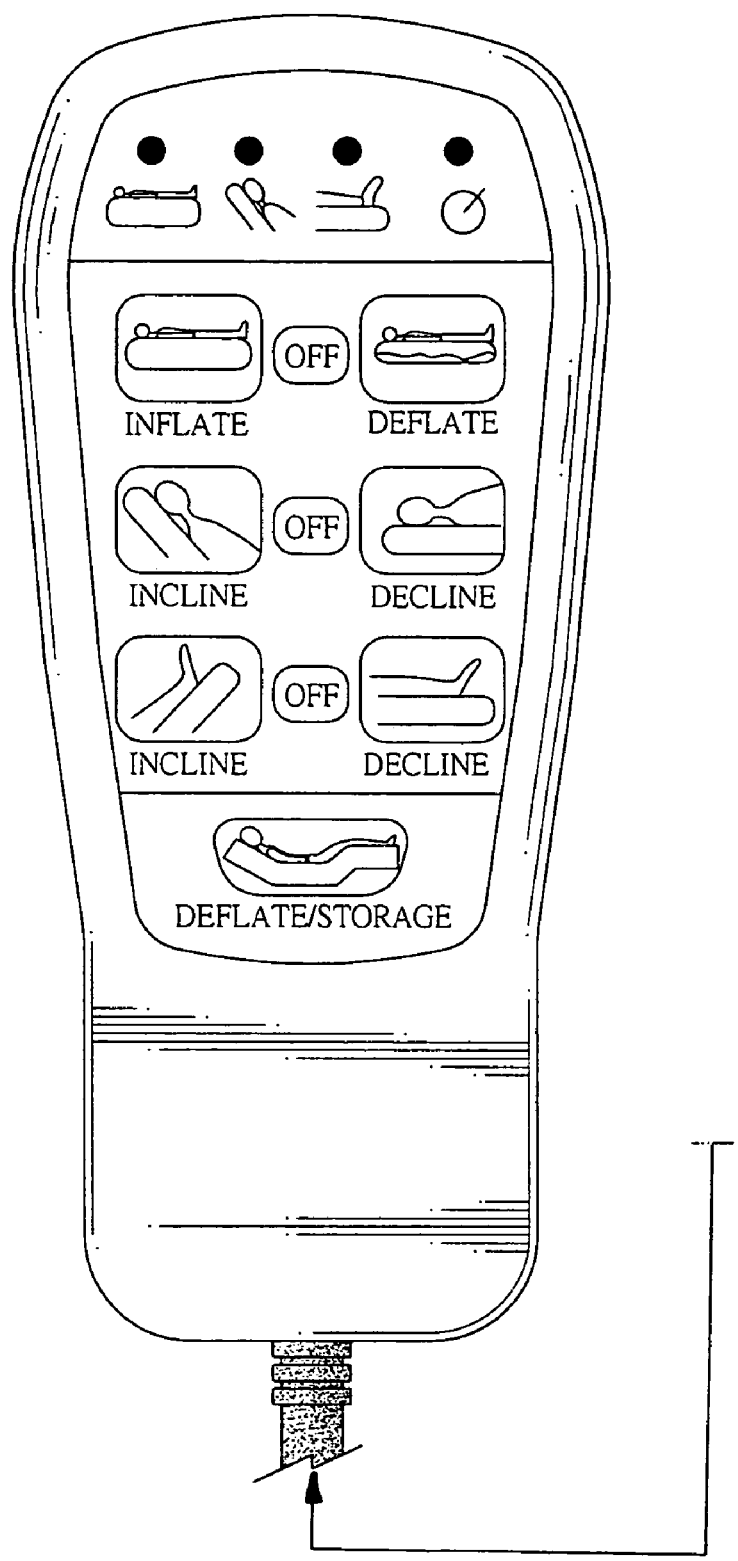
FIG.8A1

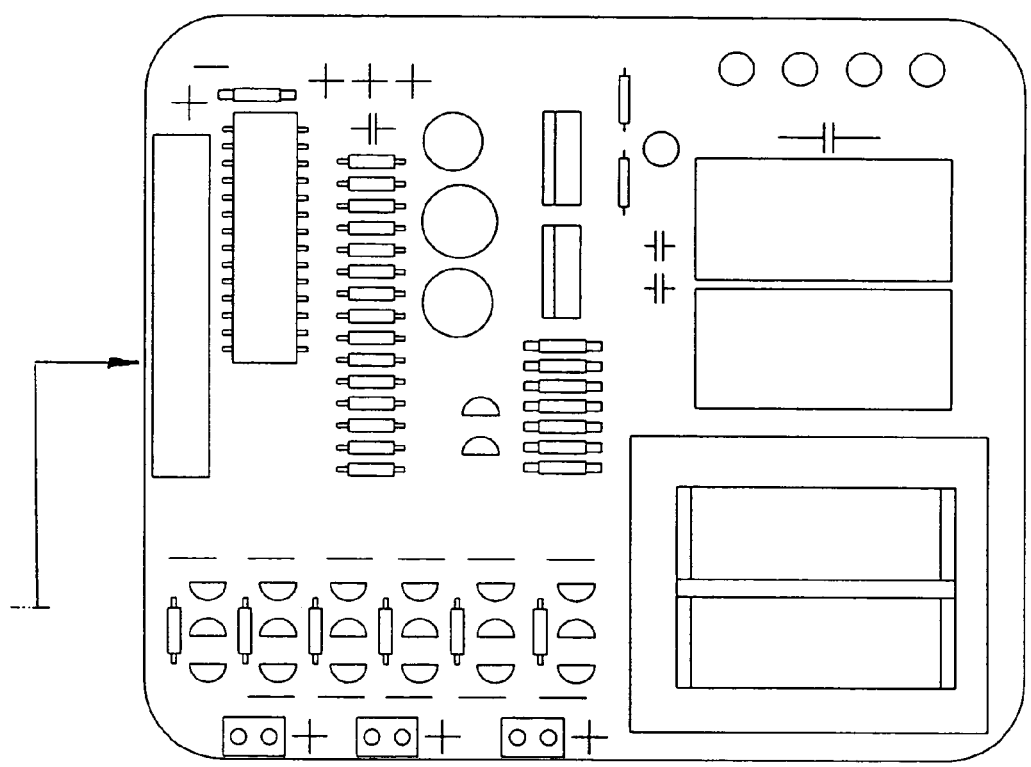
FIG.8A2

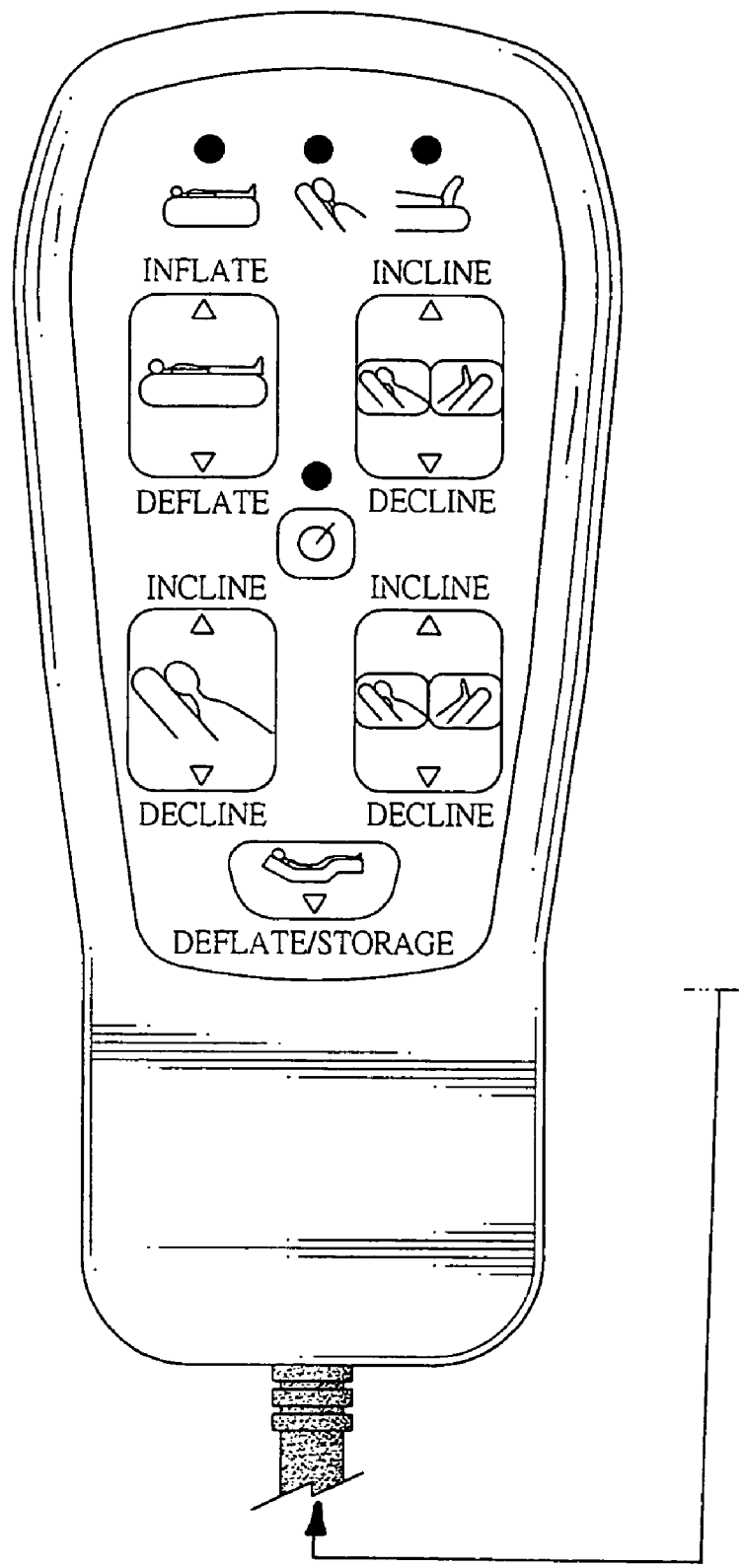
FIG.8B1

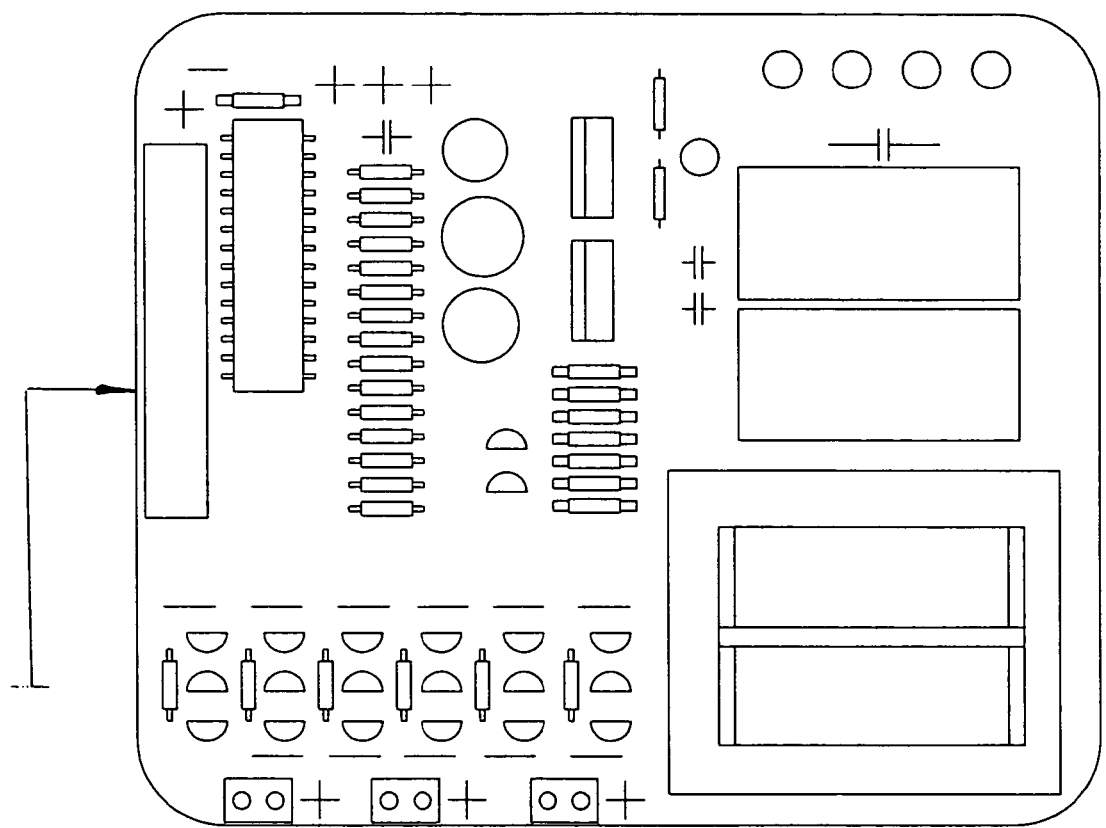
FIG.8B2

AUTOMATIC BUILT-IN AIR NOZZLE

BACKGROUND OF THE INVENTION

1. Field of the Invention

The present invention relates to an automatic built-in air nozzle and, more particularly, to an automatic built-in air nozzle to automatically close an air path in an inflatable object after inflation of the inflatable object is finished.

2. Description of the Prior Art

A conventional air nozzle is provided to inflatable products, such as an inflatable swimming pool, animal-figured toys or the like. After an air pump has been used to pump air into the inflatable product, in order to prevent air leakage from the air nozzle, a cap is provided manually to block the air path of the conventional air nozzle. Even when the air nozzle is unidirectional to have a self-sealing function, the cap is still required. That unidirectional function of the conventional air nozzle can not fully ensure that air will not escape from the inflatable product, so the cap is still necessary. Therefore, it is very troublesome for the user to remove the cap before inflating the inflatable product and to return the cap after the inflatable product has been inflated.

To overcome the shortcomings, the present invention tends to provide an improved automatic air nozzle to mitigate the aforementioned problems.

SUMMARY OF THE INVENTION

The primary objective of the present invention is to provide an automatic air nozzle to automatically close an air path inside an inflatable object. The automatic air nozzle is provided with a valve operably connected to a motor such that the motor is able to control movement of the valve to close/open the air path in the inflated/deflated object.

In one aspect of the present invention, the valve is connected to a worm shaft directly connected to the motor, and the valve is provided with a connection seat integrally formed thereon and having therein an inner threading corresponding to the worm shaft so that rotation of the worm shaft drives the valve to move linearly.

In yet another aspect of the present invention, the valve is connected to a cam directly connected to the motor, and the valve is provided with a recoil spring to maintain the valve to close the air path inside the inflatable object such that rotation of the cam controls the open/close of the air path in the object.

A further aspect of the present invention is that the worm shaft is connected to a worm gear which in turn is eccentrically connected to the valve via a linkage so that rotation of the motor drives the valve to move so as to close/open the air path in the inflatable object.

Still further, the worm shaft is indirectly connected to the motor. The motor is connected to the worm shaft via a belt.

It is noted that the design of using the motor in-place of a solenoid driven automatic valve system is better, because the motor design is cheaper in cost; does not overheat due to continuous operation; and requires less space.

Other objectives, advantages and novel features of the invention will become more apparent from the following detailed description when taken in conjunction with the accompanying drawings.

BRIEF DESCRIPTION OF THE DRAWINGS

FIGS. 7A and 7B are schematic top plan views showing that the activation of the automatic air nozzle may be controlled via cables; and FIGS. 8A and 8B are schematic top plan views showing that the activation of the automatic air nozzle may be controlled via wireless methods.

DETAILED DESCRIPTION OF THE PREFERRED EMBODIMENT

Figure 1A:
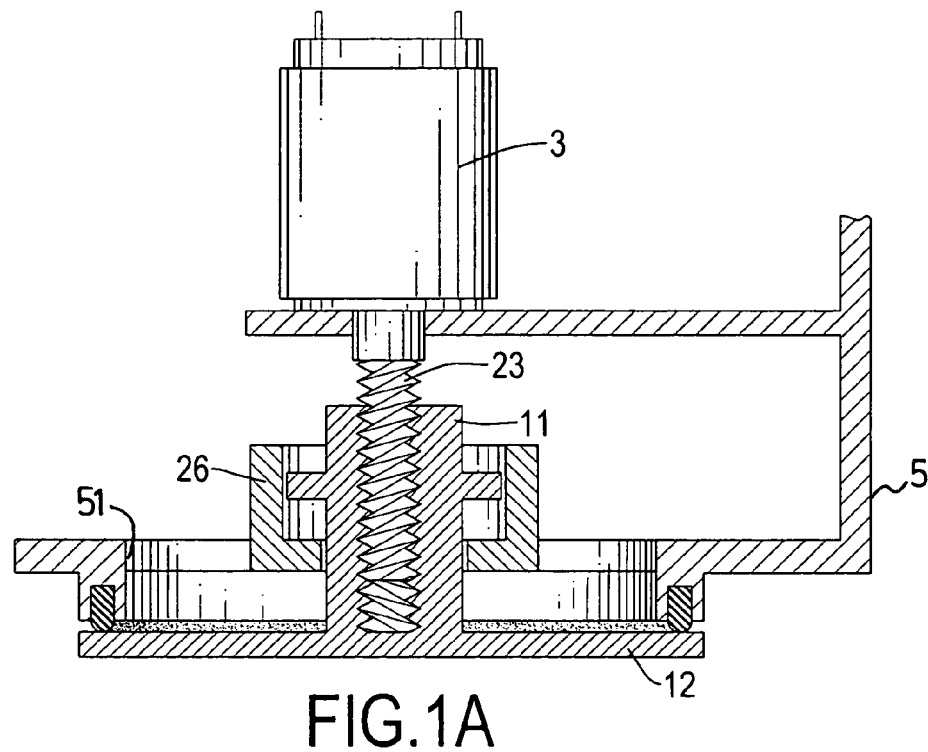
FIG. 1A is a schematic side plan view of the automatic air nozzle of the present invention with partial in cross section.
Figure 1B:
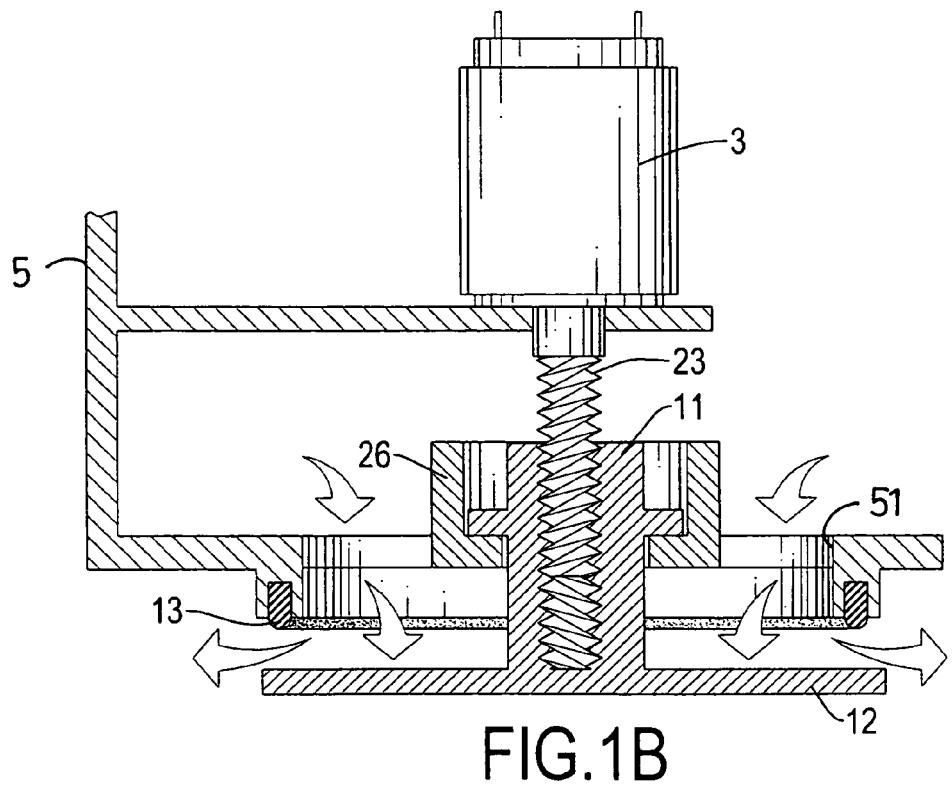
FIG. 1B is an operational view showing the air path of the inflatable object open as a result of the movement of the valve.

With reference to FIGS. 1A and 1B, the automatic built-in air nozzle in accordance with the present invention is embedded in an inflatable object (5). The inflatable object (5), may be integrated with a pump casing, preferably made of a plastic material and having therein an air path (51). The automatic built-in air nozzle includes a motor (3), a worm shaft (23) operably connected to the motor (3) and a valve (12) having thereon a connection seat (11). The connection seat (11) is provided with an inner threading to correspond to and meshed with the teeth on an outer periphery of the worm shaft (23). The inflatable object (5) is provided with a sealing ring (13) on a peripheral edge defining the air path (51) to be engaged with the valve (12). That is, the valve (12) is detachably connected to the peripheral edge to form an airtight seal inside the inflatable object (5) which might be integrated with a pump casing when the valve (12) is engaged with the sealing ring (13). In order to maintain linear movement of the valve (12), the inflatable object (5) further has a limiting seat (26) formed with the inflatable object (5) and having the connection seat (11) extended through the limiting seat (26).

Therefore, when the motor (3) is initiated and the worm shaft (23) is rotated by the motor (3), the valve (12) is moved up and down to close/open the air path (51) of the inflatable object (5).

Figure 2A:
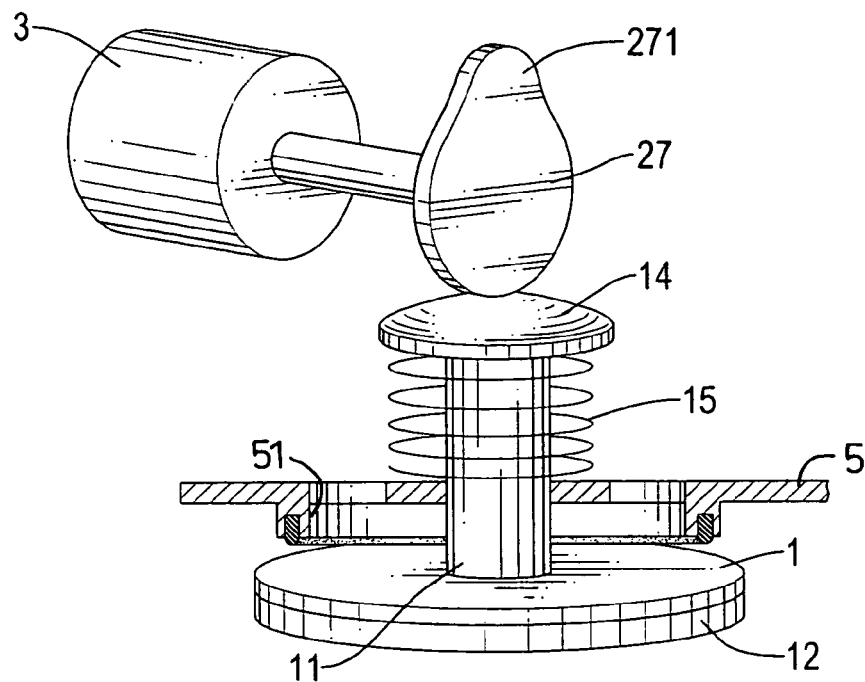
FIG. 2A is a perspective view of the automatic air nozzle of the present invention.
Figure 2B:
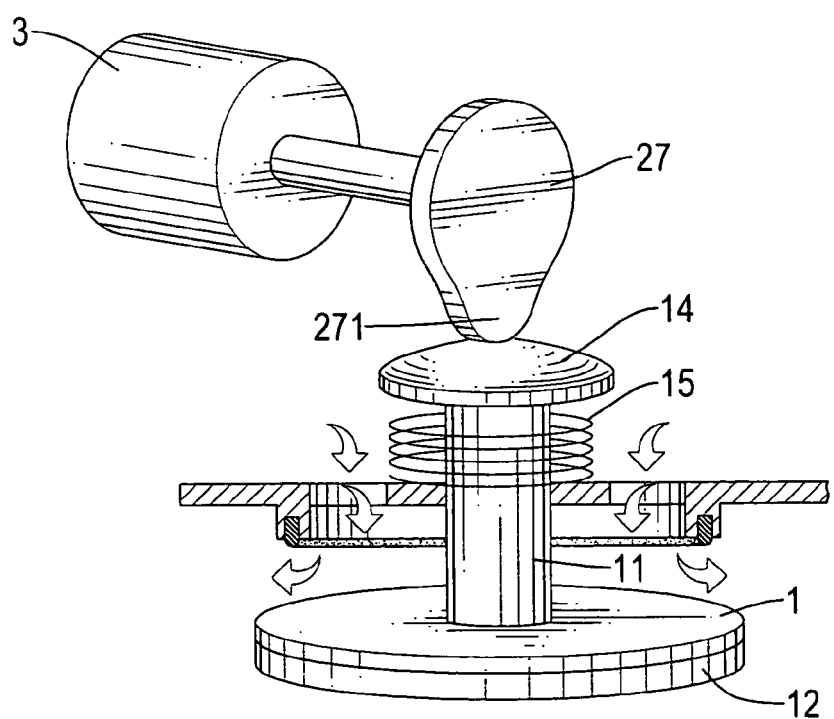
FIG. 2B is a perspective view showing the operation of the valve to open the air path inside the object.

With reference to FIGS. 2A and 2B, a second embodiment of the present invention is shown, wherein the same element in this embodiment will be designated with the same reference numeral as that in the first embodiment shown in FIGS. 1A and 1B. The automatic air nozzle of the present invention is provided with a motor (3), a cam (27) operably connected to the motor (3) and having a protruded head (271) formed with the cam (27), a valve (12) formed at a bottom end of a connection seat (11) which has a connection block (14) formed on a top end thereof to be abutted to the cam (27). Furthermore, a recoil spring (15) is mounted around the connection seat (11) and sandwiched between a bottom face of the connection block (14) and a side face adjacent to the air path (51) of the inflatable object (5) to maintain the valve (12) to close the air path (51) at all times when the motor (3) is not activated.

When the motor (3) is activated and the cam (27) is rotated via the motor (3), connection of the protruded head (271) to the connection block (14) forces the connection seat (11) as well as the valve (12) to move away from the air path (51) so as to allow air to move into/away from the inflatable object (5).

Figure 3A:
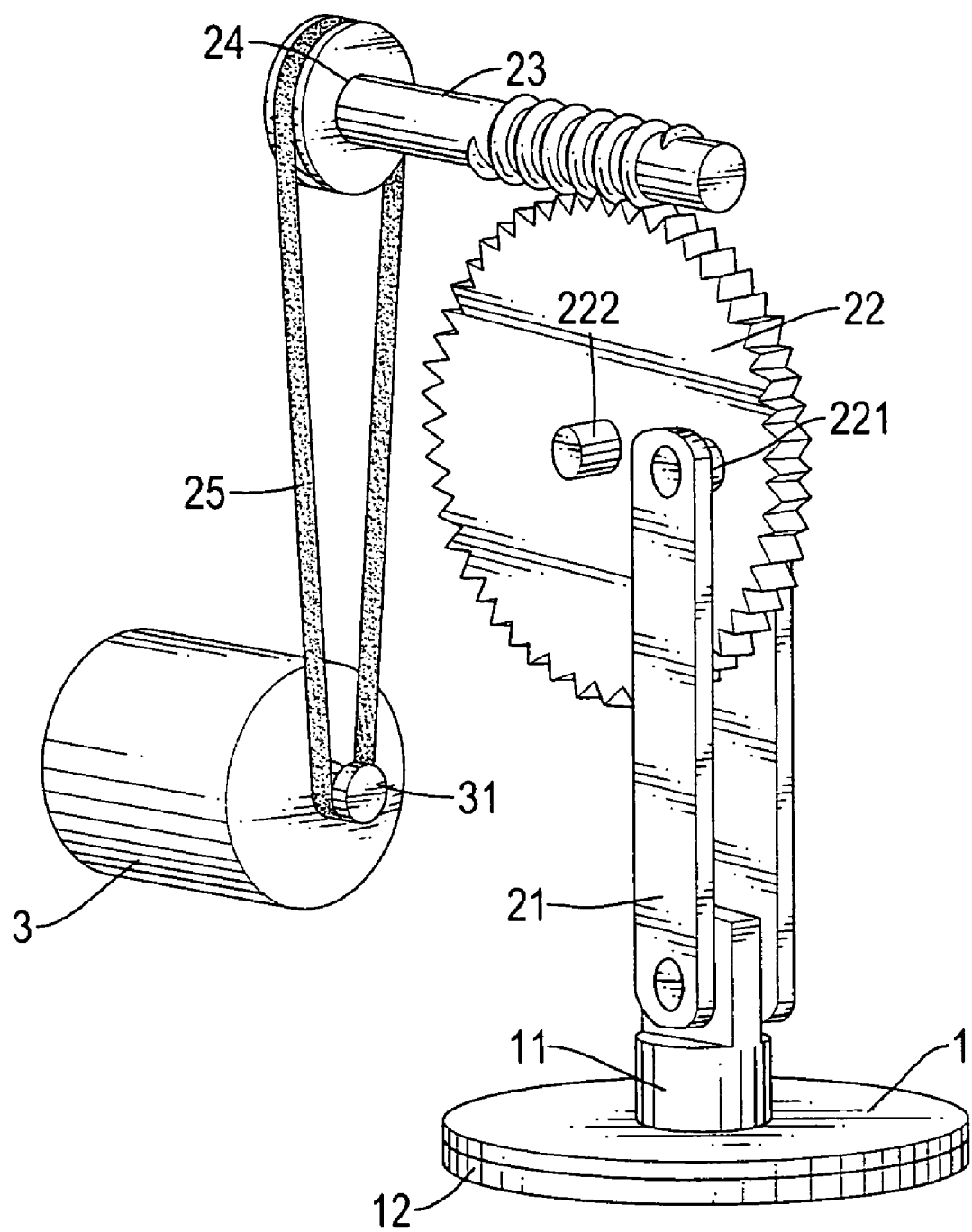
FIG. 3A is a perspective view of the air nozzle of the present invention.
Figure 3B:
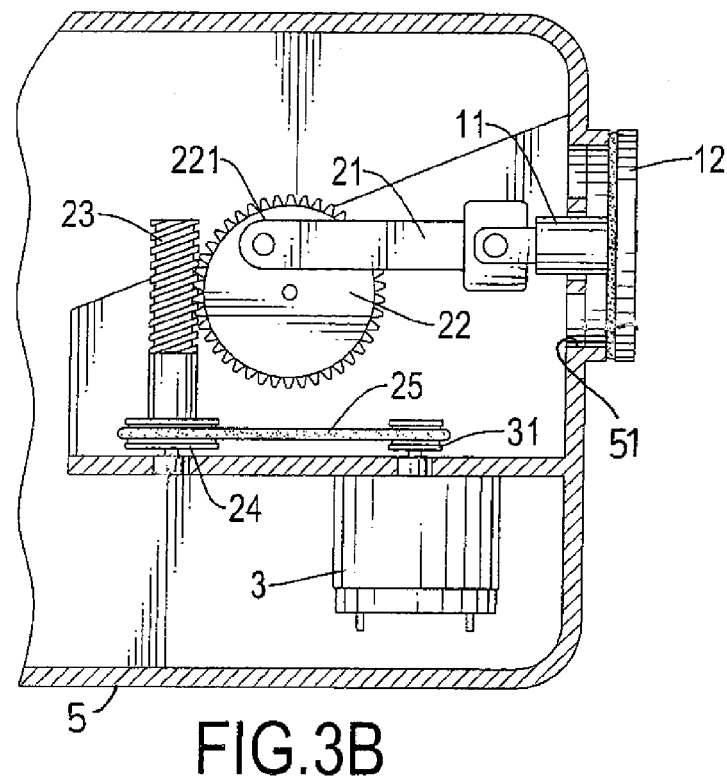
FIG. 3B is a schematic side plan view showing that the automatic air nozzle is applied to the inflatable object.
Figure 3C:
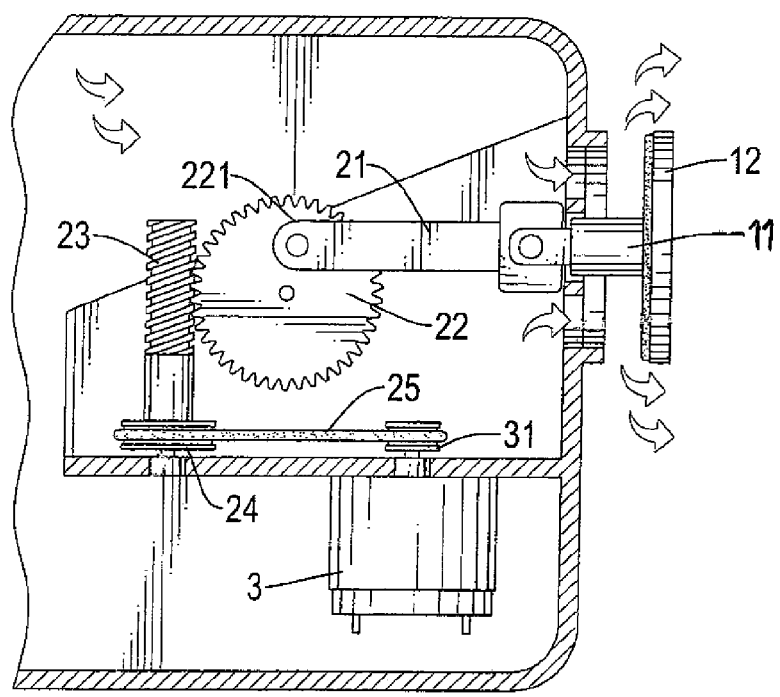
FIG. 3C is an operational side plan view showing the movement of the valve to open the air path of the object.
Figure 3D:
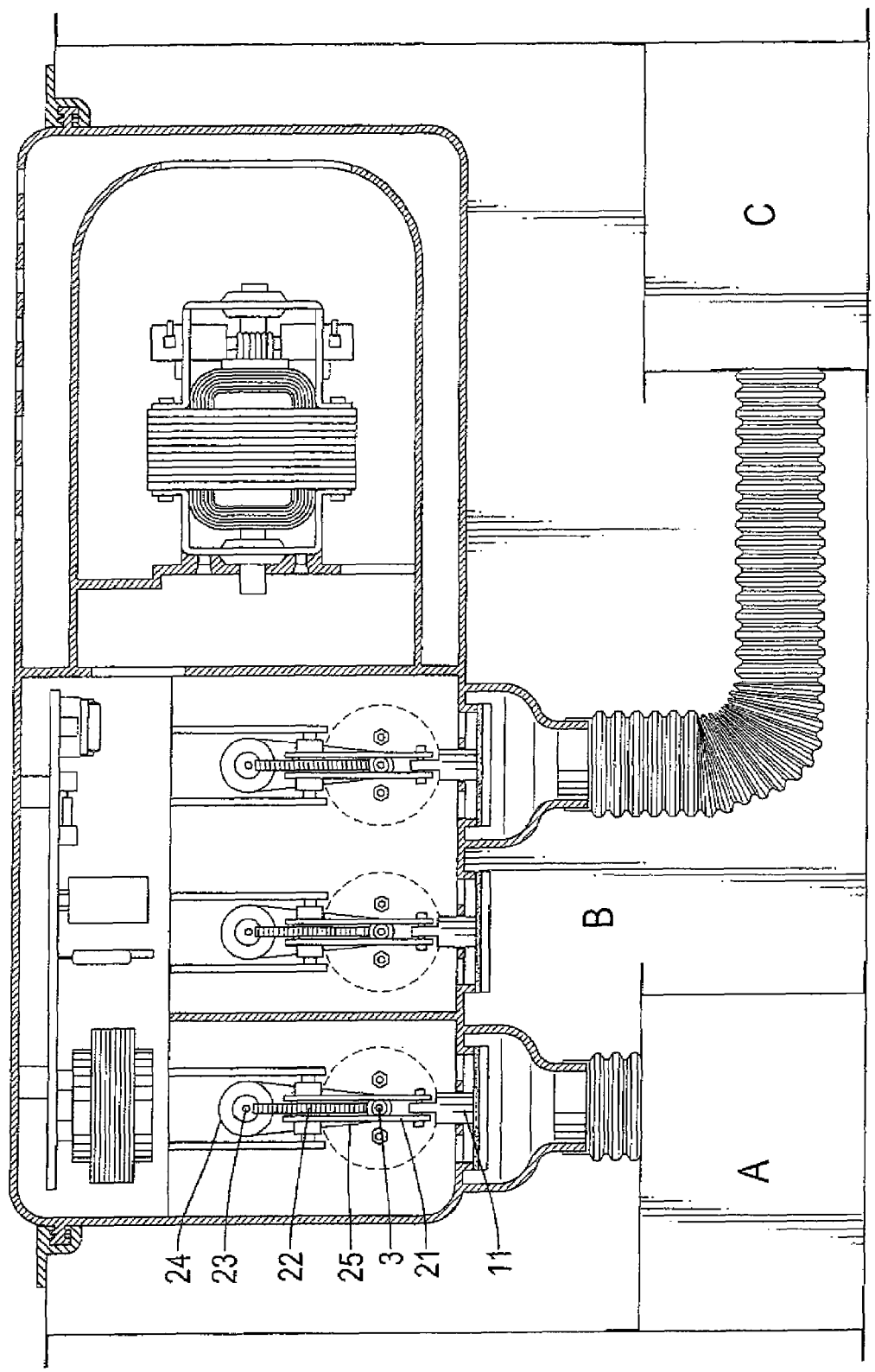
FIG. 3D is a schematic side plan view showing that the automatic air nozzle is applied respectively to three different chambers inside an inflatable object.
Figure 3E:
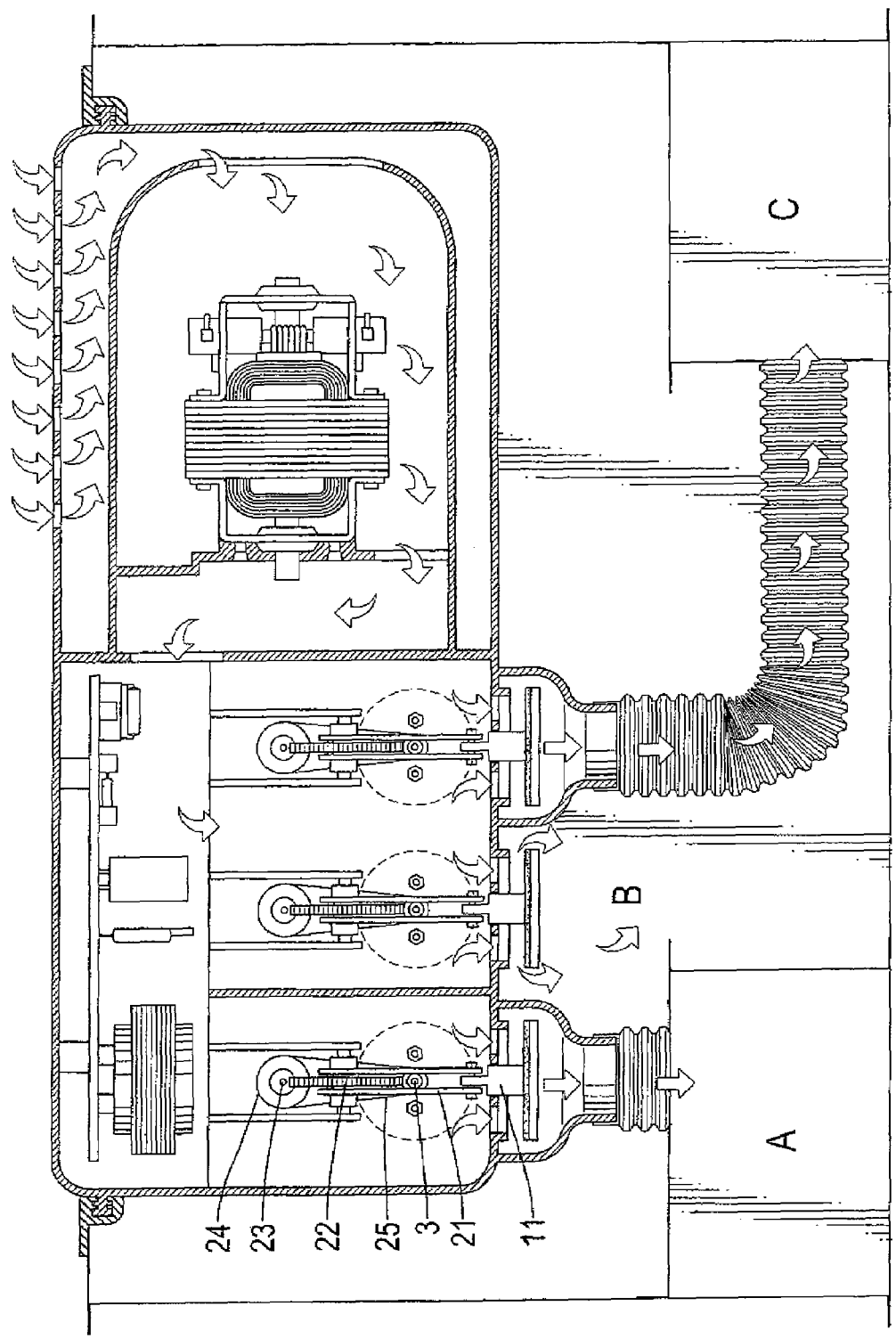
FIG. 3E is an operational view showing that the automatic air nozzle is activated to inflate the inflatable object.
Figure 3F:
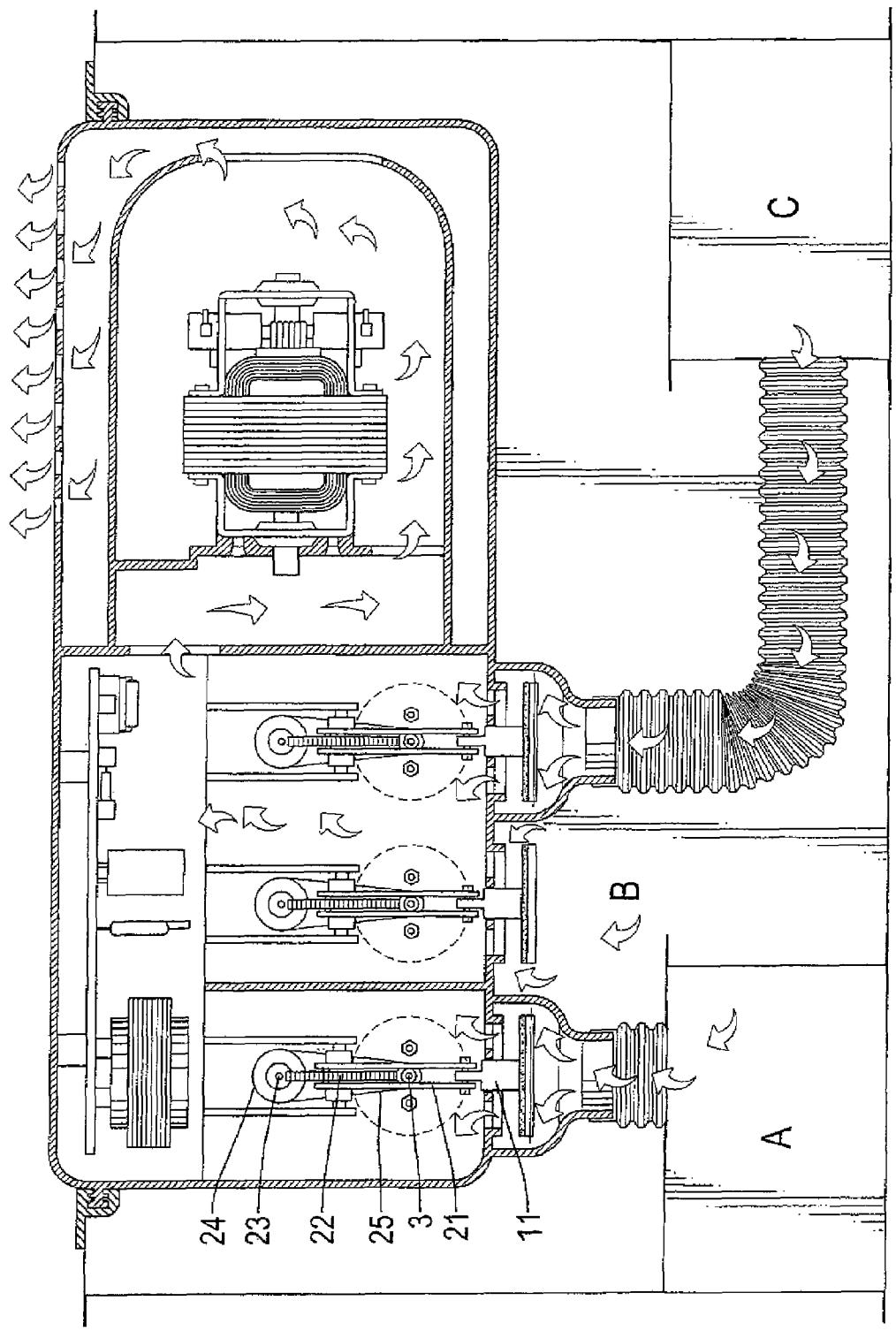
FIG. 3F is an operational view showing that the automatic air nozzle is activated to deflate the inflatable object.

With reference to FIG. 3A, a third embodiment of the automatic air nozzle of the present invention is shown and includes a motor (3) having thereon a first wheel (31), a worm shaft (23) having a second wheel (24) formed with the worm shaft (23) and connected to the first wheel (31) via a belt (25), a worm gear (22) meshed with the worm shaft (23), a linkage (21) eccentrically and pivotally connected to the worm gear (22) at location (221) and a valve (12) formed on a free end of a connection seat (11) which is firmly connected to a top face (1) of the valve (12) and pivotally formed on a free end of the linkage (21). The linkage (21) is pivotally connected to the worm gear (22) via a shaft (221) on a side face of the worm gear (22). A central shaft (222) is formed at a center of the worm gear (22) to be firmly connected to the inflatable object (5), as shown in FIGS. 3B-3F.

After the automatic air nozzle of the present invention is firmly mounted inside the inflatable object (5) via the central shaft (222) (shown in FIG. 3A), the valve (12) is located at the air path (51) of the inflatable object (5). Thus, when the motor (3) is activated, the rotation of the worm shaft (23) drives the worm gear (22) to rotate, and the valve (12) is linearly moved to close/open the air path (51) of the inflatable object (5). Especially, when the automatic air nozzle of the present invention is embedded inside an inflatable object (5) having therein three different chambers (A,B,C). When the inflation process to the inflatable object (5) is finished, automatic closing the air path (51) as a result of the movement of the valve (12) saves a lot of effort and manual labor for the operator.

Figure 4:
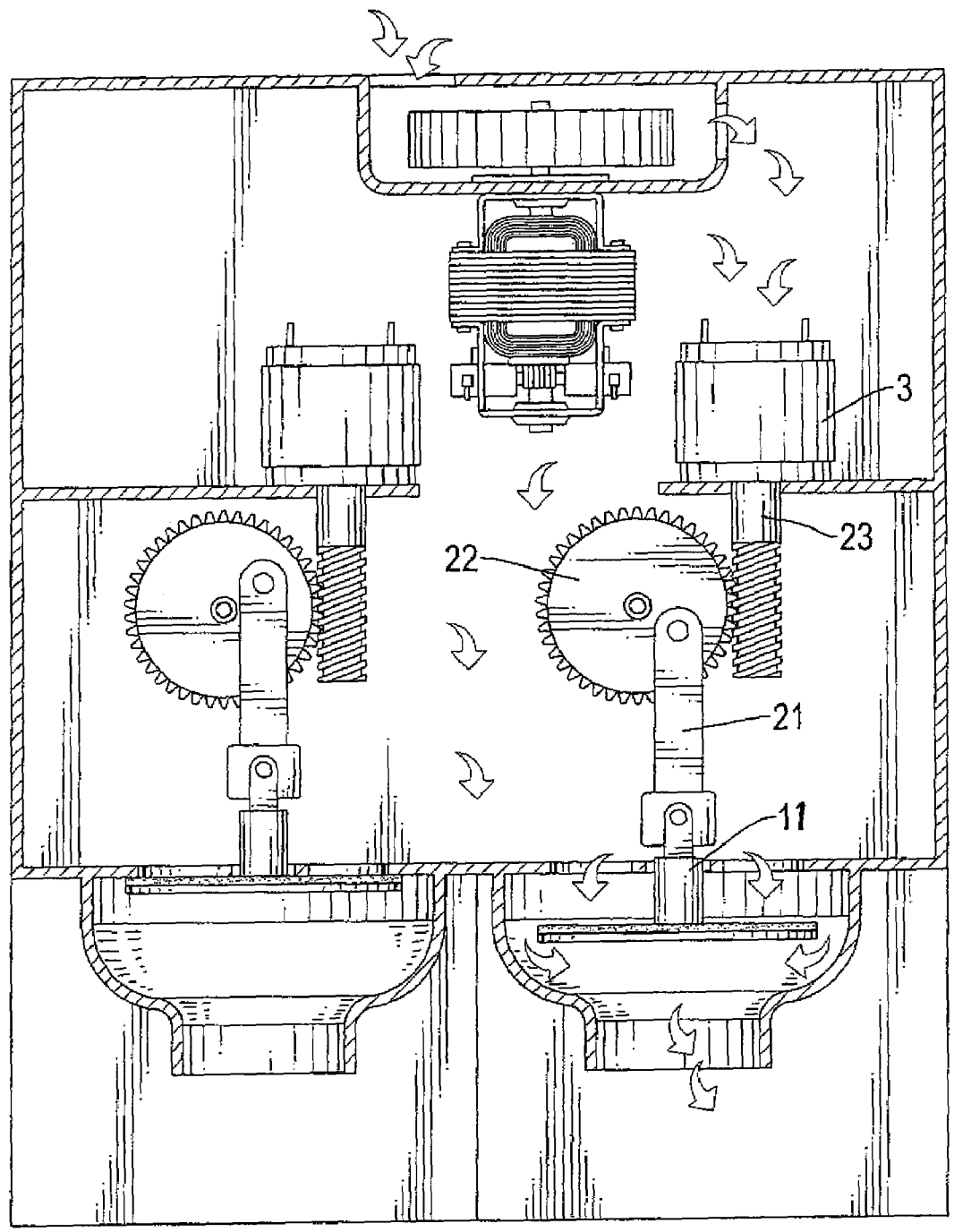
FIG. 4 is a schematic view showing the automatic air nozzle of the present invention.

With reference to FIG. 4, the fourth embodiment of the present invention is shown, and this embodiment is substantially the same as that as shown in FIG. 3A. The only difference therebetween is that the worm shaft (23) is directly connected to the motor (3). Therefore, the activation of the motor (3) is able to drive the worm shall (23) to rotate. Accordingly, the valve (12) is able to close/open the air path (51) of the inflatable object (5).

Figure 5A:
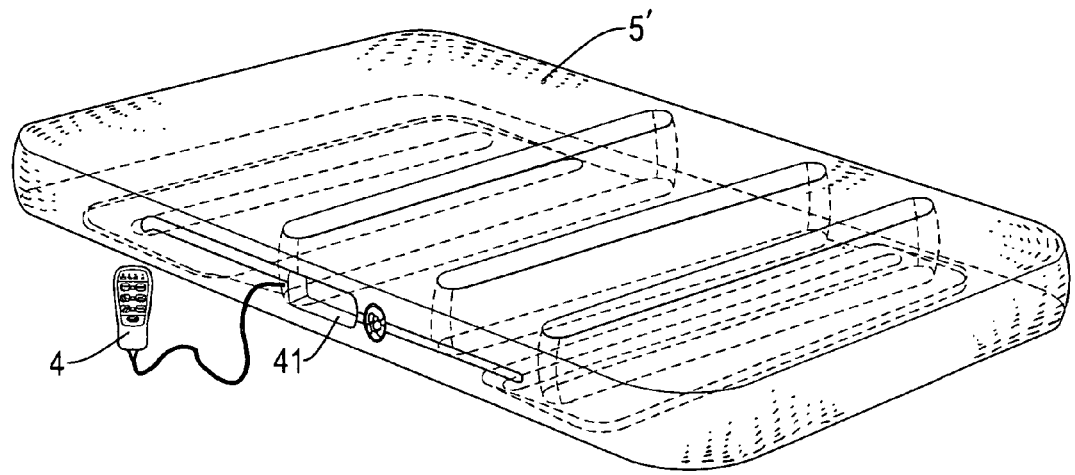
FIG. 5A is a schematic perspective view showing the location where the automatic air nozzle is mounted inside the inflatable object.
Figure 5B:
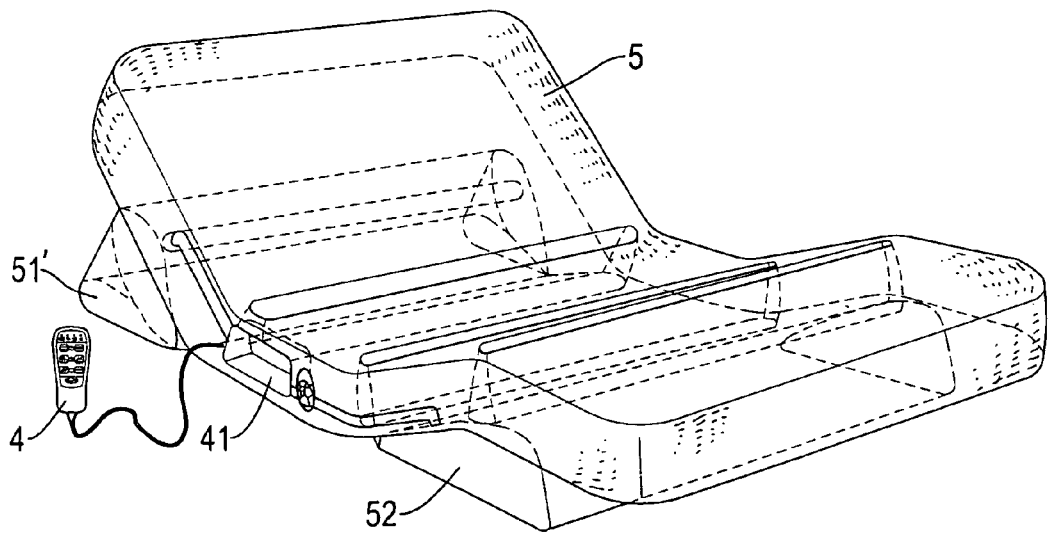
FIG. 5B is a schematic perspective view showing that the inflatable object having a backrest parcel and a leg-rest parcel respectively inflated by the automatic air nozzle of the present invention.

With reference to FIGS. 5A and 5B, an inflatable mattress (5') is shown and has a controller (4) and a casing (41) embedded inside the inflatable mattress (5'). The automatic air nozzle of the present invention is installed inside the casing (41). The inflatable mattress (5') further has a backrest parcel (51') located at an upper portion of the inflatable mattress (5') and a leg-rest parcel (52) located at a lower portion of the inflatable mattress (5'). In order to inflate the backrest parcel (51') and the leg-rest parcel (52), the inflatable mattress (5') may be provided with a single pump or multiple pumps to inflate the parcels.

Figure 6A:
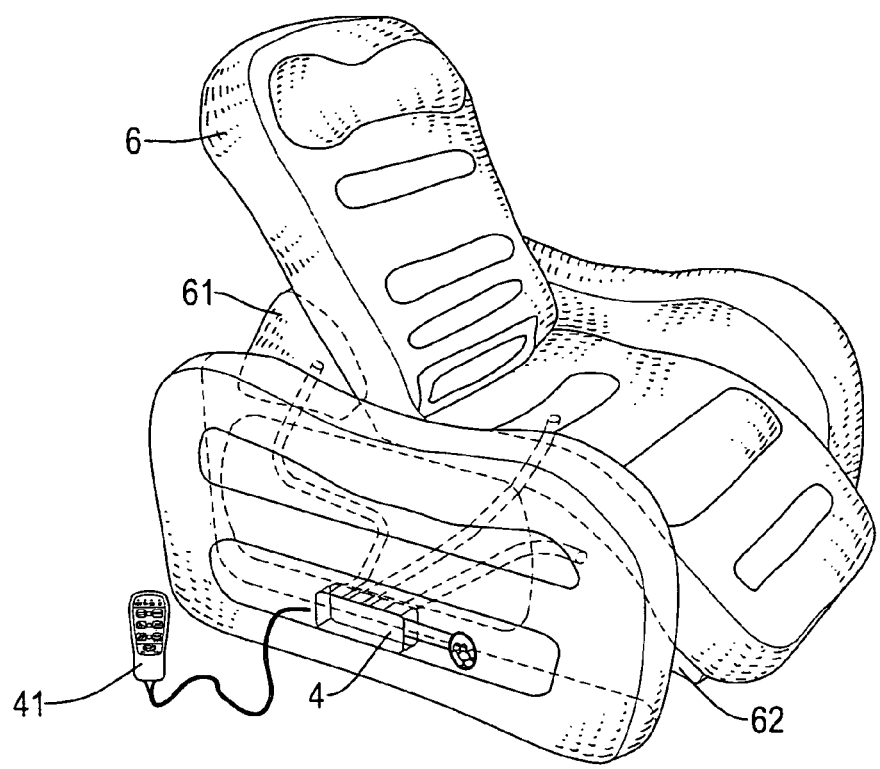
FIG. 6A is a schematic perspective view showing that after the backrest parcel is inflated, the inflatable object becomes a sofa.
Figure 6B:
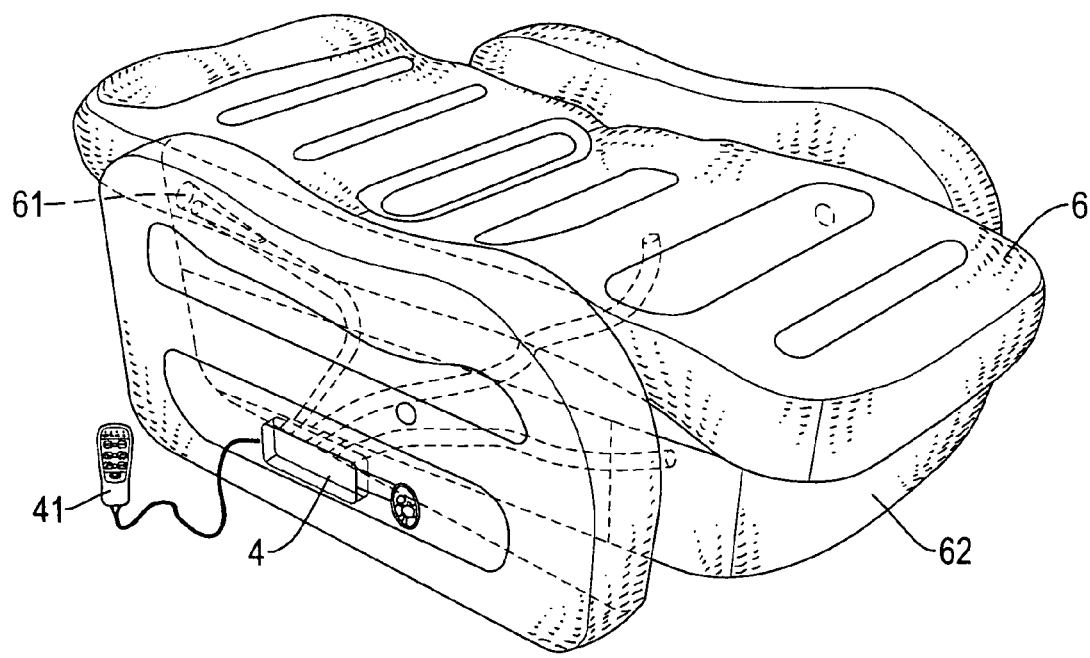
FIG. 6B is a schematic perspective view showing that after the leg-rest parcel is inflated, the inflatable object becomes a bed.

With reference to FIGS. 6A and 6B, it is seen that an inflatable mattress (6) has a backrest parcel (61) located at an upper portion of the inflatable mattress (6) and a leg-rest parcel (62) located at a lower portion of the inflatable mattress (6). When the backrest parcel (61) is inflated, the inflatable mattress (6) becomes a chair. When the leg-rest parcel (62) is inflated but not the backrest parcel (61), the inflatable mattress (6) becomes a bed. It is also known in the art that the backrest parcel (61) and the leg-rest parcel (62) may be combined into one via a well known method in the art.

With reference to FIGS. 7A-7B and 8A-8B, the activation of the motor of the present invention may be controlled via a cable controlled method or via a wireless control method.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatic air nozzle for an inflatable object having therein an air path, the automatic air nozzle comprising:
   a valve adapted to engage with a peripheral side face defining the air path;
   a linking element having a first end operably connected to the valve and a second end and comprising
      a worm shaft having a longitudinal axis; and
      a worm gear rotatable about a gear axis perpendicular to the longitudinal axis of the worm shaft, with the worm gear having multiple teeth formed on an outer periphery of the worm gear and engaging the worm shaft; and
   a motor adapted to be embedded inside the inflatable object and operably connected to the second end of the linking element so as to drive the worm shaft to rotate and drive the worm gear to rotate and in turn to drive the valve to move along an axis perpendicular to the longitudinal axis of the worm shaft relative to the inflatable object to open/close the air path automatically.

2. The automatic air nozzle as claimed in claim 1, wherein the linking element further comprises a linkage eccentrically and pivotally formed on the worm gear, the valve is connected to a free end of the linkage.

3. The automatic air nozzle as claimed in claim 1, wherein the linking element further comprises a linkage pivotally connected to the worm gear, the valve is connected to a free end of the linkage.

4. The automatic air nozzle as claimed in claim 1, wherein the valve is moved linearly via the motor.

5. The automatic air nozzle as claimed in claim 1, wherein the inflatable object is integrated with a pump casing.

6. The automatic air nozzle as claimed in claim 1, wherein the motor is connected to the worm shaft of the linking element via a belt.

7. The automatic air nozzle as claimed in claim 2, wherein the motor is connected to the worm shaft of the linking element via a belt.

* * * * *